(12) United States Patent
Johansen et al.

(10) Patent No.: US 10,288,472 B2
(45) Date of Patent: May 14, 2019

(54) METHOD AND APPARATUS FOR COMPENSATION OF WIND EFFECTS ON MEASURED WEIGHTS

(71) Applicant: Digi-Star, LLC, Oakland, NJ (US)

(72) Inventors: Steven L. Johansen, Whitewater, WI (US); Daniel Eric Fuller, Fort Atkinson, WI (US)

(73) Assignee: DIGI-STAR, LLC, Fort Atkinson, WI (US)

( * ) Notice: Subject to any disclaimer, the term of this patent is extended or adjusted under 35 U.S.C. 154(b) by 238 days.

(21) Appl. No.: 15/352,148

(22) Filed: Nov. 15, 2016

(65) Prior Publication Data
US 2018/0136033 A1    May 17, 2018

(51) Int. Cl.
| | | |
|---|---|---|
| *G01G 19/00* | (2006.01) | |
| *G01G 19/08* | (2006.01) | |
| *A01C 15/00* | (2006.01) | |
| *B65G 67/24* | (2006.01) | |
| *G01G 23/01* | (2006.01) | |
| *G01G 11/08* | (2006.01) | |
| *A01C 7/10* | (2006.01) | |
| *A01C 17/00* | (2006.01) | |

(52) U.S. Cl.
CPC .......... *G01G 19/08* (2013.01); *A01C 15/006* (2013.01); *B65G 67/24* (2013.01); *G01G 11/08* (2013.01); *G01G 23/01* (2013.01); *A01C 7/102* (2013.01); *A01C 17/006* (2013.01)

(58) Field of Classification Search
None
See application file for complete search history.

(56) References Cited

U.S. PATENT DOCUMENTS

| | | | | |
|---|---|---|---|---|
| 4,722,456 A | * | 2/1988 | Laidlaw | G01G 11/086 177/185 |
| 5,764,522 A | * | 6/1998 | Shalev | A01K 5/02 177/116 |
| 7,017,624 B2 | * | 3/2006 | Reinsch | G01G 13/18 141/198 |
| 7,507,917 B2 | * | 3/2009 | Kaltenheuser | A01D 41/12 177/136 |
| 9,820,436 B2 | * | 11/2017 | Inoue | A01D 41/1272 |

(Continued)

FOREIGN PATENT DOCUMENTS

| | | |
|---|---|---|
| EP | 1985170 A1 | 10/2008 |
| EP | 2524584 A2 | 11/2012 |

OTHER PUBLICATIONS

PCT International Search Report and Written Opinion from PCT Application No. PCT/US2017/057333 dated May 7, 2018; 20 pgs.

*Primary Examiner* — Truc M Do
(74) *Attorney, Agent, or Firm* — Chiesa Shahinian & Giantomasi PC

(57) ABSTRACT

A method for compensating for wind effects on measured weights includes receiving initialization sensor values from a seed tender. An estimated discharge is generated based on the initialization sensor values. A weight sensor value from the seed tender is received after the initialization sensor values. The weight sensor value is compared to a threshold value corresponding to a value of the estimated discharge at a corresponding time. Based on the comparison, it is determined whether to transmit the weight sensor value or the threshold value to the seed tender controller.

11 Claims, 8 Drawing Sheets

(56) References Cited

U.S. PATENT DOCUMENTS

| | | | |
|---|---|---|---|
| 2002/0030117 A1 | 3/2002 | Bryan et al. | |
| 2003/0042050 A1 | 3/2003 | Stimpson | |
| 2006/0178579 A1* | 8/2006 | Haynes | A61B 8/08 600/437 |
| 2007/0083293 A1* | 4/2007 | Applegate | A01B 79/005 700/282 |
| 2007/0289783 A1* | 12/2007 | Tump | G01G 11/086 177/200 |
| 2009/0099775 A1* | 4/2009 | Mott | A01B 69/008 701/300 |
| 2009/0110608 A1* | 4/2009 | Vierheilig | B01J 8/0015 422/110 |
| 2009/0192654 A1 | 7/2009 | Wendte et al. | |
| 2010/0314221 A1* | 12/2010 | Garberson | A01C 15/003 198/617 |
| 2011/0168455 A1* | 7/2011 | Davis, Jr. | G01G 13/12 177/1 |
| 2012/0099948 A1* | 4/2012 | Bump | G01G 13/16 414/21 |
| 2013/0045067 A1* | 2/2013 | Pickett | A01B 69/008 414/345 |
| 2014/0284118 A1* | 9/2014 | Van Mill | B65G 43/00 177/1 |
| 2014/0286731 A1* | 9/2014 | Van Mill | B65G 67/04 414/21 |
| 2018/0100759 A1* | 4/2018 | Johansen | A01B 76/00 |

\* cited by examiner

US 10,288,472 B2

METHOD AND APPARATUS FOR COMPENSATION OF WIND EFFECTS ON MEASURED WEIGHTS

BACKGROUND

The present disclosure relates generally to agricultural machines, and more particularly to compensation of wind effects on measured weights.

The agricultural industry uses carts, containers, trucks, etc. to move large amounts of agricultural material such as animal feed and/or seed. The process of loading and unloading agricultural materials from an agricultural machine, such as a seed tender, requires accurate weight measurements. These weight measurements are based on data from load sensors located on the agricultural machine that sense the weight of agricultural material located in a container associated with the agricultural machine. For example, a hopper of a seed tender can have load cells associated with it in order to sense the weight of seed in the hopper. The loading and unloading of seed to and from the seed tender requires accurate weight measurement in order to manage allocation of material and costs.

Errors in the weight sensed can be caused by wind. For example, gusts of wind hitting one or more sides of a container holding agricultural material that is mounted to an agricultural machine can affect the weight sensed by load sensors. The wind can cause inaccurate weight readings. These inaccurate weight readings can cause problems during loading and unloading of agricultural material from the container of the agricultural machine. This is because the loading and unloading of the agricultural material is a critical process and inaccurate weight readings during these processes can cause misallocation of material, increase costs, and affect the user's ability to manage costs.

SUMMARY

In one embodiment, a method for compensating for wind effects on measured weights includes receiving initialization sensor values from an agricultural machine. In one embodiment, the initialization sensor values comprise at least ten values, each of the ten values associated with a particular time. The initialization sensor values can be received after erratic sensor values by waiting a period of time after startup of a loading or unloading cycle. The initialization sensor values can be identified based on changes in value between temporally adjacent initialization sensor values within a variance threshold. An estimated discharge is generated based on the initialization sensor values. The threshold value can be further based on additional estimated discharges generated based on previous weight sensor values. In one embodiment, an additional estimated discharge approximates weight sensor values changing over time when the seed tender is unloaded in a no wind or low wind environment. A weight sensor value from the seed tender is received after the initialization sensor values. The weight sensor value is compared to a threshold value corresponding to a value of the estimated discharge at a corresponding time. The weight sensor value is transmitted to a seed tender controller in response to the weight sensor value being below the threshold value based on the estimated discharge. The threshold value is transmitted to the seed tender controller in response to the weight sensor value being at or above the threshold value. In one embodiment, the threshold value is generated based on the estimated discharge.

DETAILED DESCRIPTION

Figure 1:
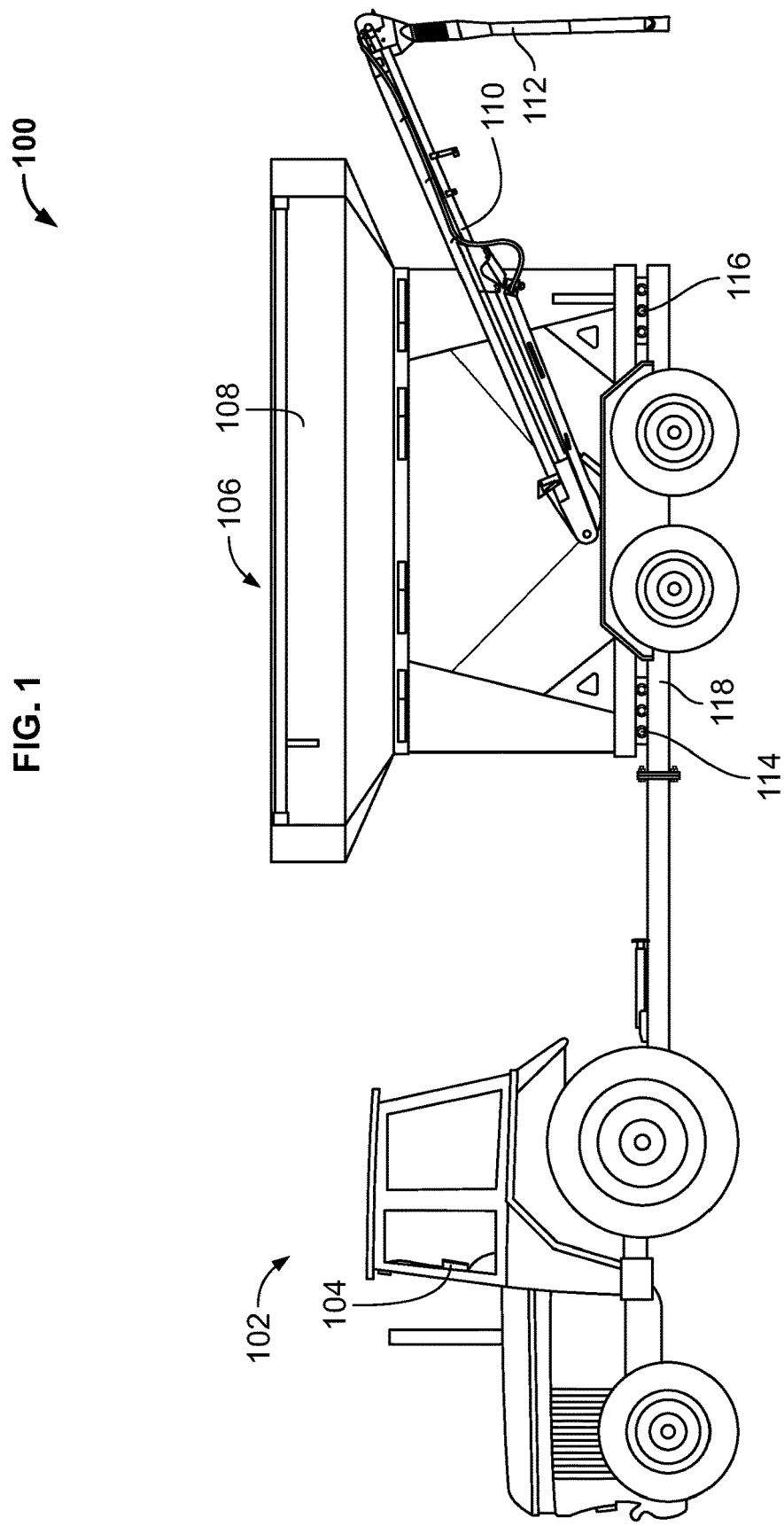
FIG. 1 depicts a system for cancellation of wind effects on measured weights according to one embodiment.

FIG. 1 depicts a system 100 for compensation of wind effects on measured weights according to one embodiment. System 100 is configured to measure the weight of material in an agricultural machine and compensate for the effects of wind on the measured weights.

System 100, according to one embodiment, includes tractor 102 coupled to seed tender 106. The coupling allows tractor 102 to move seed tender 106 to various locations as desired by a user. Seed tender 106 includes hopper 108 for holding agricultural material, in this case, seed. Boom 110 is movably connected to base of hopper 108. Seed located in hopper 108 is gravity fed to a base of boom 110 where an auger (not shown) receives the seed and moves it in boom 110 to dispersal hose 112. In operation, a user moves boom 110 so that dispersal hose 112 can be located where the user wants to place seed. For example, boom 110 can be moved so that dispersal hose 112 is located above an agricultural machine designed to plant seeds. A user then actuates the auger located in boom 110 in order to move seed from hopper 108 through boom 110 and dispersal hose 112 to the agricultural machine designed to plant seeds. The auger located in boom 110 is typically hydraulically driven and controlled manually using levers or via input to an electronic controller.

The weight of seed in hopper 108 is determined using load cells 114, 116. In one embodiment, load cells 114, 116 are located between hopper 108 and chassis 118 of seed tender 106 to which hopper 108 is connected. Load cells 114, 116, sense the weight of hopper 108 and material located in hopper 108. In one embodiment, load cells 114, 116 are electrical sensors which transmit data to machine control indicator 104 shown located in cab of tractor 102. Information pertaining to the weight of seed located in hopper 108 can be displayed to a user via machine control indicator 104 based on data received from load cells 114, 116. Although machine control indicator 104 is shown located in cab of tractor 102, machine control indicator 104 can be mounted in other locations, such as on seed tender 106. It should be noted that FIG. 1 depicts weight measurement using two load cells. In other embodiments, different numbers of load cells can be used. For example, in one embodiment, four load cells are used for weight measurement.

The unloading process on a seed tender is fairly linear, meaning that the unload rate is generally constant while the auger is moving for a given speed setting of the auger. However, wind gusts can affect weight readings and cause improper amounts of seed to be moved out of hopper 108.

Figure 2:
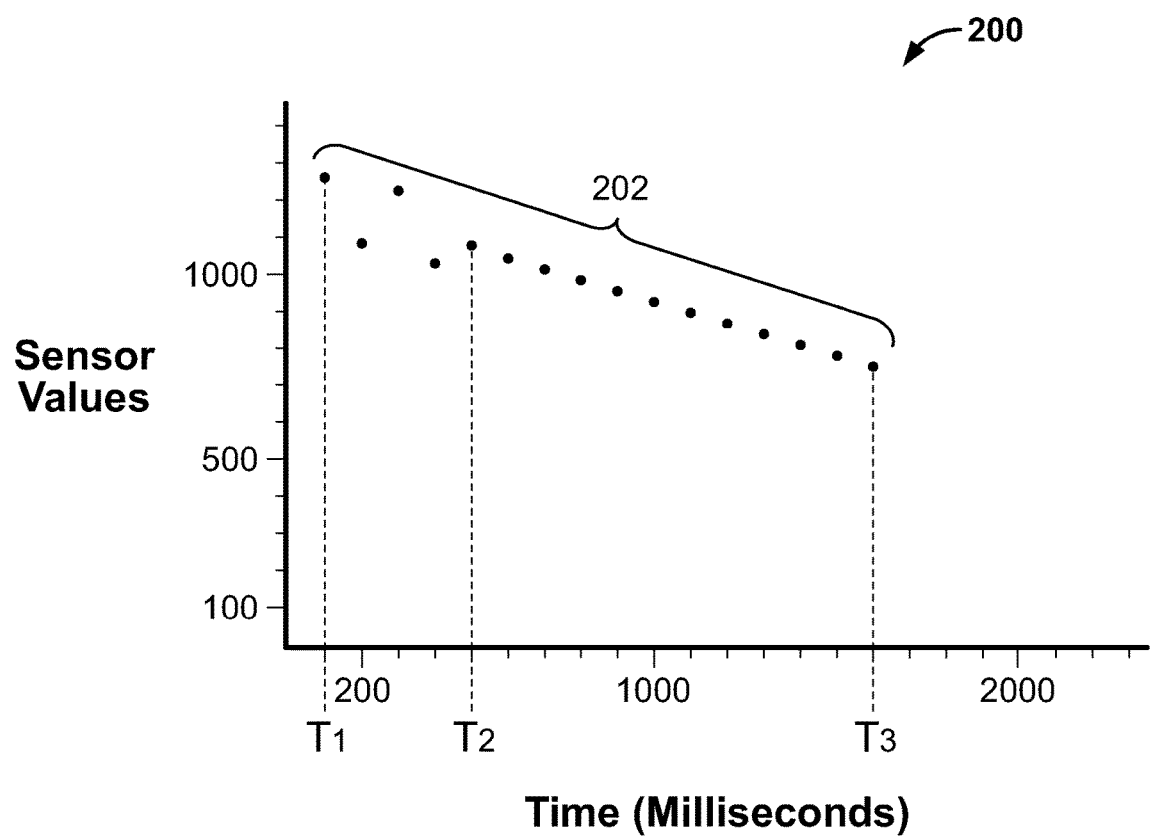
FIG. 2 depicts a graph showing sensor values representing a weight of seed in a seed tender over time.

FIG. 2 depicts graph 200 illustrating sensor values 202 received by machine control indicator 104 from load cells 114, 116 over time (in milliseconds) during unloading of material from hopper 108. Sensor values 202 represent a weight of material in hopper 108 but, in one embodiment, are not actual weight values. The sensor values need to be converted to determine an actual weight of material. As shown in FIG. 2, sensor values are determined periodically. In one embodiment, sensor values are determined every 100 milliseconds but can be determined at different intervals.

As shown in graph 200, sensor values 202 are erratic from time T1 to time T2 before decreasing at a substantially constant rate from time T2 to time T3. The erratic sensor values from time T1 to time T2 can be caused by initial startup of the unloading processes. For example, actuation of various components of seed tender 106 during startup, such as the auger of boom 110 and/or opening or closing of a grain door associated with hopper 108, can be detected by load cells 114, 116 from time T1 to time T2. From time T2 to T3 sensor values 202 decrease at a substantially constant rate after the end of initial startup as material is being moved out of hopper 108 by the auger at a substantially constant rate. In one embodiment, the decrease of weight at a substantially constant rate from time T2 to time T3 is used to generate an estimated discharge.

Figure 3:
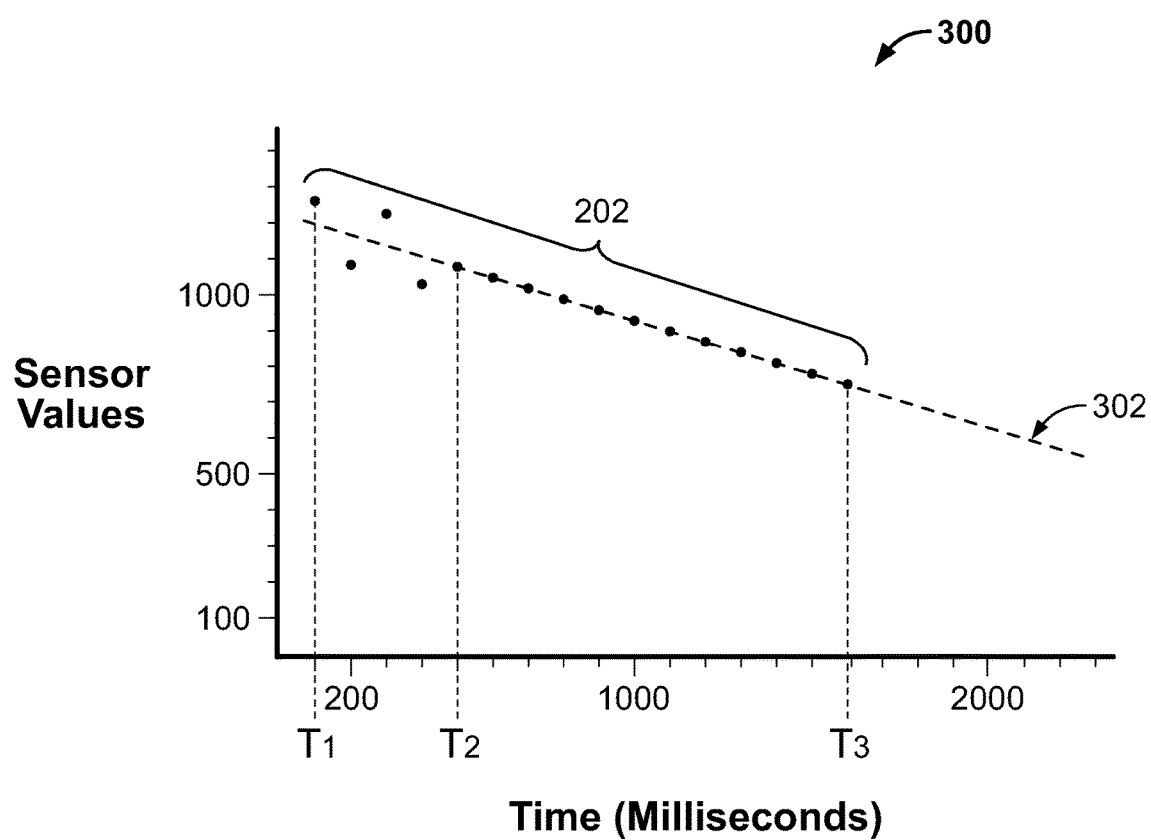
FIG. 3 depicts a graph showing an estimated discharge.

FIG. 3 depicts graph 300 illustrating an estimated discharge 302 generated based on sensor values 202. In one embodiment, estimated discharge 302 is generated using a best fit linear regression technique based on sensor values after initial startup has ended (i.e., sensor values from time T2 to time T3). Sensor values 202 from time T2 to time T3 are referred to as initialization sensor values. The initialization sensor values are used to generate estimated discharge 302. In one embodiment, at least ten sensor values after time T2 are used to generate estimated discharge 302. Time T2 must be identified in order to determine when to consider the sensor values are accurate enough to be considered initialization sensor values.

In one embodiment, T2 is based on a predetermined time period after an unloading cycle has begun. For example, initial startup of an unload cycle (i.e., time T1) can be designated as when machine control indicator 104 transmits commands related to unloading to seed tender 106 (e.g., actuate auger). T2 can be designated as the end of a period of time after initial startup of an unload cycle. As such, the period of time from time T1 to time T2 is considered to be when erratic sensor values can occur and the sensor values that occur from time T1 to time T2 are not used as initialization values.

In one embodiment, T2 is determined to occur when changes in value between temporally adjacent sensor values are within an empirically determined variance threshold. For example, the change in value between temporally adjacent sensor values from time T1 to time T2 shown in FIG. 3 can be determined to be above a variance threshold and disregarded. The change in value between temporally adjacent sensor values after time T2 is determined to be within the variance threshold. As such, in one embodiment, sensor values received after time T2 are used as initialization sensor values.

After the initialization sensor values have been received and the estimated discharge has been generated, sensor values received during unloading of an agricultural machine are compared to a value that is based on the estimated discharge at a particular corresponding time. In one embodiment, deviation of a sensor value from the value based on the estimated discharge more than a specified amount while the agricultural machine is unloading will result in compensation of the sensor value.

Figure 4:
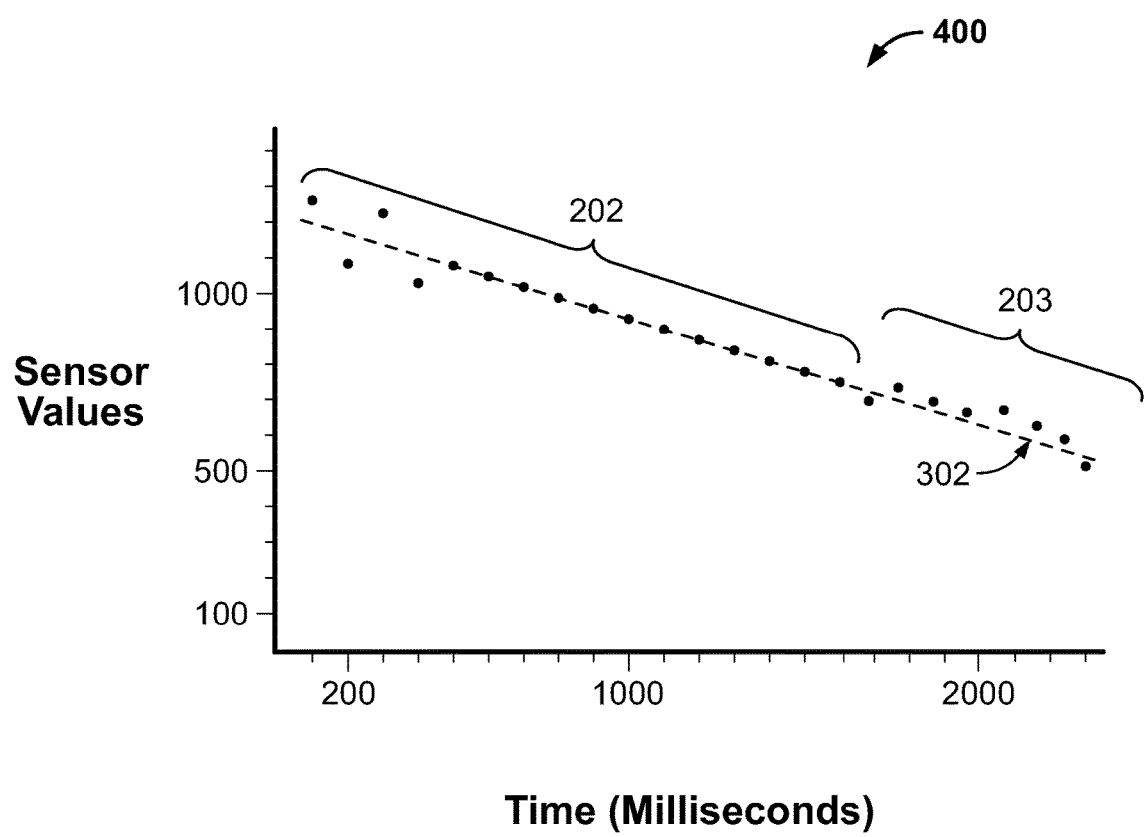
FIG. 4 depicts a graph showing particular sensor values and an estimated discharge.

FIG. 4 depicts graph 400 which depicts the same information as FIG. 3 with the exception of additional sensor values 203. Graph 400 depicts sensor values 202 received during startup and initialization sensor values. Graph 400 also depicts sensor values 203 received after initialization values have been received and used to generate estimated discharge 302. As shown in FIG. 4, sensor values 203 are shown located slightly above and below estimated discharge 302 and reflect unloading of material from an agricultural machine. Sensor values 203 deviating from estimated discharge 302 may not be accurate with the deviations caused by slight wind, actuation of components of the agricultural machine, etc. These inaccurate sensor values can cause an amount of material to be unloaded from hopper 108 greater than the desired amount. However, the inaccuracy of sensor values 203 is not excessive as compared to sensor values that are caused by wind hitting an agricultural machine during an unload cycle. Inaccurate sensor values due to significant wind hitting the agricultural machine need to be compensated for in order to prevent inaccurate unloading of material.

In order to compensate for wind in weight measurements in one embodiment, a threshold value (described below) is generated and compared to sensor values in order to determine if a particular sensor value or the threshold value should be used to determine the weight of material in hopper 108. In one embodiment, a wind compensation module receives the sensor values, generates the estimated discharge and the threshold value, and compares sensor values to the threshold value in order to determine a value to represent the weight of material in hopper 108.

Figure 5:
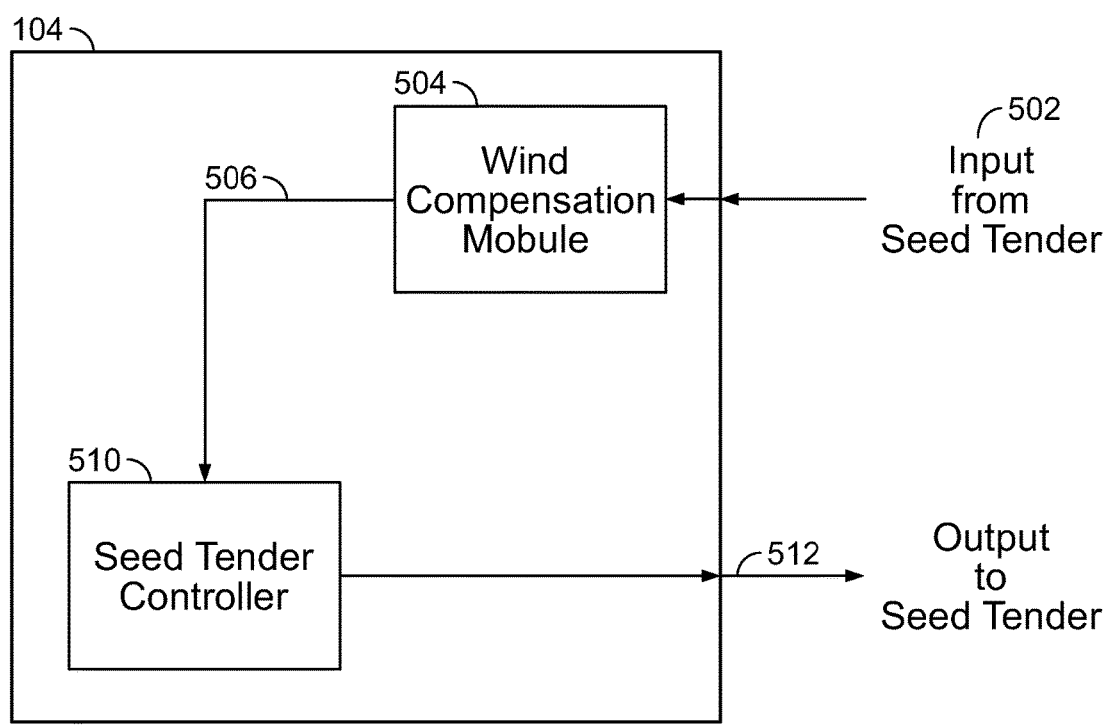
FIG. 5 depicts a machine control indicator according to one embodiment.
Figure 7:
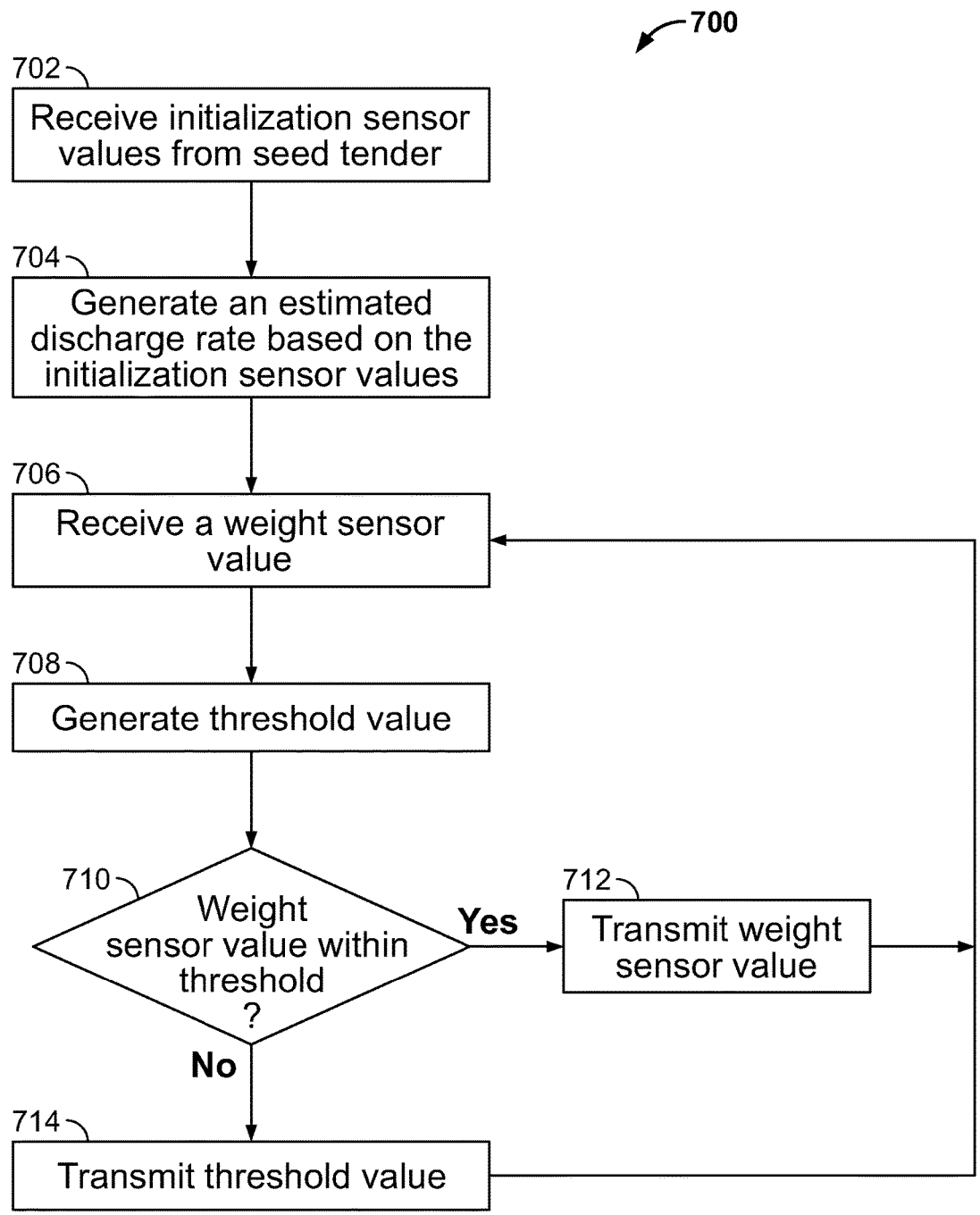
FIG. 7 depicts a flowchart of a method for cancelling wind effects on measured weights according to one embodiment.

FIG. 5 depicts machine control indicator 104 according to one embodiment. As shown in FIG. 5, input from seed tender 502, including sensor values from load cells 114, 116, is received by machine control indicator 104. Specifically, the input from seed tender 502 is received by wind compensation module 504. Wind compensation module 504 analyzes the sensor values received from load cells 114, 116 (as shown in FIG. 7 and described herein) and chooses one of a sensor value or a corresponding threshold value based on the analysis. Wind compensation module 504 then transmits the chosen value 506 to seed tender controller 510 which analyzes the transmitted value to generate output commands to seed tender 106. The output commands are then transmitted as output to seed tender 512. Since wind compensation module 504 receives sensor values from load cells 114, 116 and transmits these sensor values to seed tender controller 510, sensor values that are affected by wind can be compensated for at the wind compensation module 504 before being transmitted to seed tender controller 510.

In one embodiment, the threshold value can be based on a percentage of a value of the estimated discharge at a particular time. For example, the threshold value may be determined to be 105% of the corresponding value of the estimated discharge at a particular time. The sensor value is compared to the threshold value to determine if the sensor value is at, above, or below the threshold value. The threshold value can be generated based on the estimated discharge and additional estimated discharges. The additional estimated discharges can be generated using sensor values from prior unload cycles. An additional estimated discharge can be selected from unload cycles in which various wind conditions were present. For example, the threshold value can be generated based on an estimated discharge based on a current unload cycle and an additional estimated discharge based on a prior unload cycle in which high wind conditions occurred.

Figure 6:
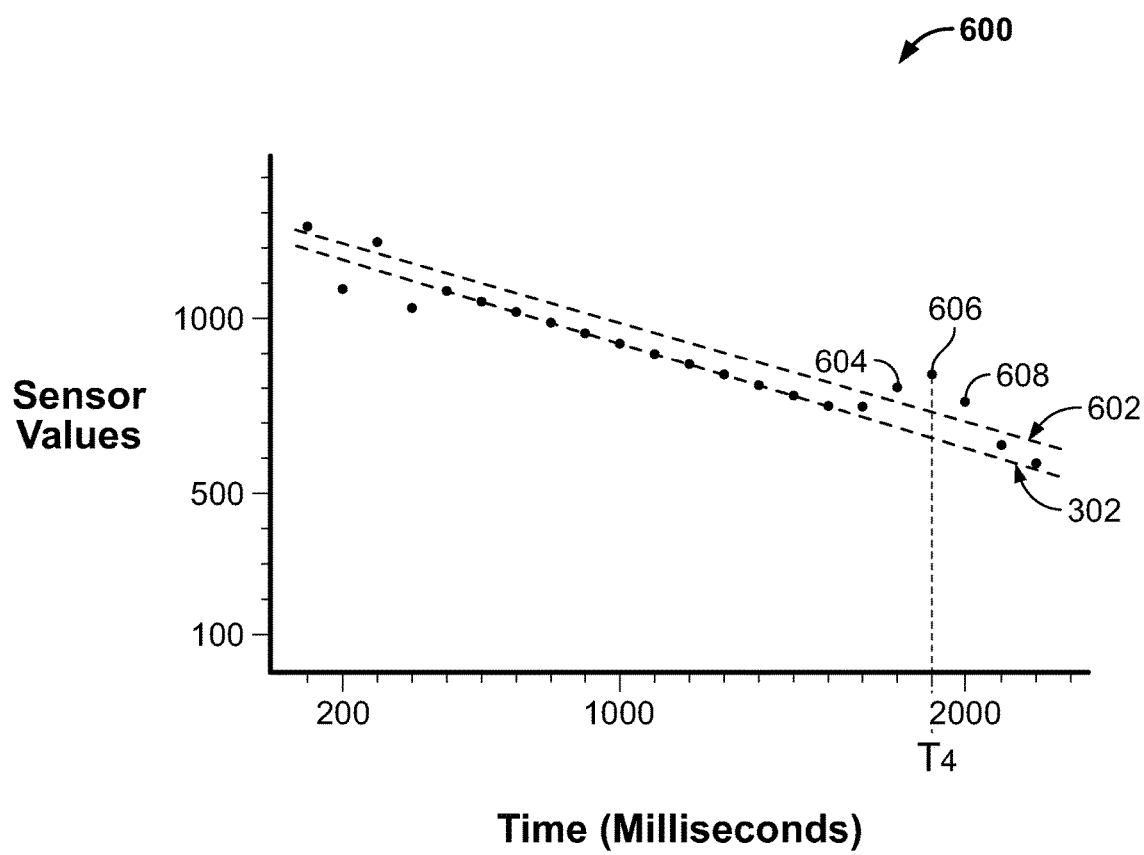
FIG. 6 depicts a graph including sensor values, an estimated discharge, and a threshold curve.

FIG. 6 depicts graph 600, which is similar to graph 400 but includes threshold curve 602. Threshold curve 602 (shown in FIG. 6 as a straight line having a negative slope) is generated by wind compensation module 504 (shown in FIG. 5) based on a percentage of estimated discharge 302. As shown in FIG. 6, the values of points along threshold curve 602 are higher than the values of estimated discharge 302 at any particular corresponding time. Sensor values 604, 606, and 608 are shown at time T4 located above threshold curve 602. As such, the comparison of sensor values 604, 606, and 608 to values of threshold curve 602 at corresponding times indicate that those sensor values are higher than the threshold values at corresponding times. In one embodiment, sensor values 604, 606, and 608 would be changed to the threshold curve values at corresponding times before being transmitted to seed tender controller 510 (shown in FIG. 5).

FIG. 7 depicts a flow chart 700 of a method for wind compensation of measured weights according to one embodiment. In one embodiment, wind compensation module 504 shown in FIG. 5 performs the steps of flow chart 700 as follows. At step 702, initialization sensor values are received from the seed tender. Specifically, data from load cells 114, 116 is received. At step 704, an estimated discharge is generated based on the initialization sensor values. In one embodiment, at least 10 values, each associated with a respective time, are used to generate the estimated discharge using a best fit linear regression technique.

At step 706, a weight sensor value is received from load cells 114, 116 of seed tender 106 (see FIG. 1). At step 708, a threshold value is generated for comparison to the weight sensor value. In one embodiment, the threshold value is based on a corresponding value of the estimated discharge at a corresponding time. The threshold value can be further based on an additional estimated discharges generated based on previous weight sensor values.

At step 710, the weight sensor value is compared to the threshold value to determine if the sensor value is within the threshold. If the weight sensor value is within the threshold, then the method proceeds to step 712 and the weight sensor value is transmitted to seed tender controller 510. If the weight sensor value is at or above the threshold, then the method proceeds to step 714 and the threshold value is transmitted to seed tender controller 510. In one embodiment, the decision to transmit one of the weight sensor value and the threshold value is referred to as generating a new weight sensor value. The new weight sensor value is transmitted to seed tender controller 510.

In one embodiment, steps 706 through 710 (and 712 or 714 depending on the determination made in step 710) are repeated until seed tender controller determines that a user specified amount of seed has been unloaded from seed tender 106 and the unloading process is stopped.

Figure 8:
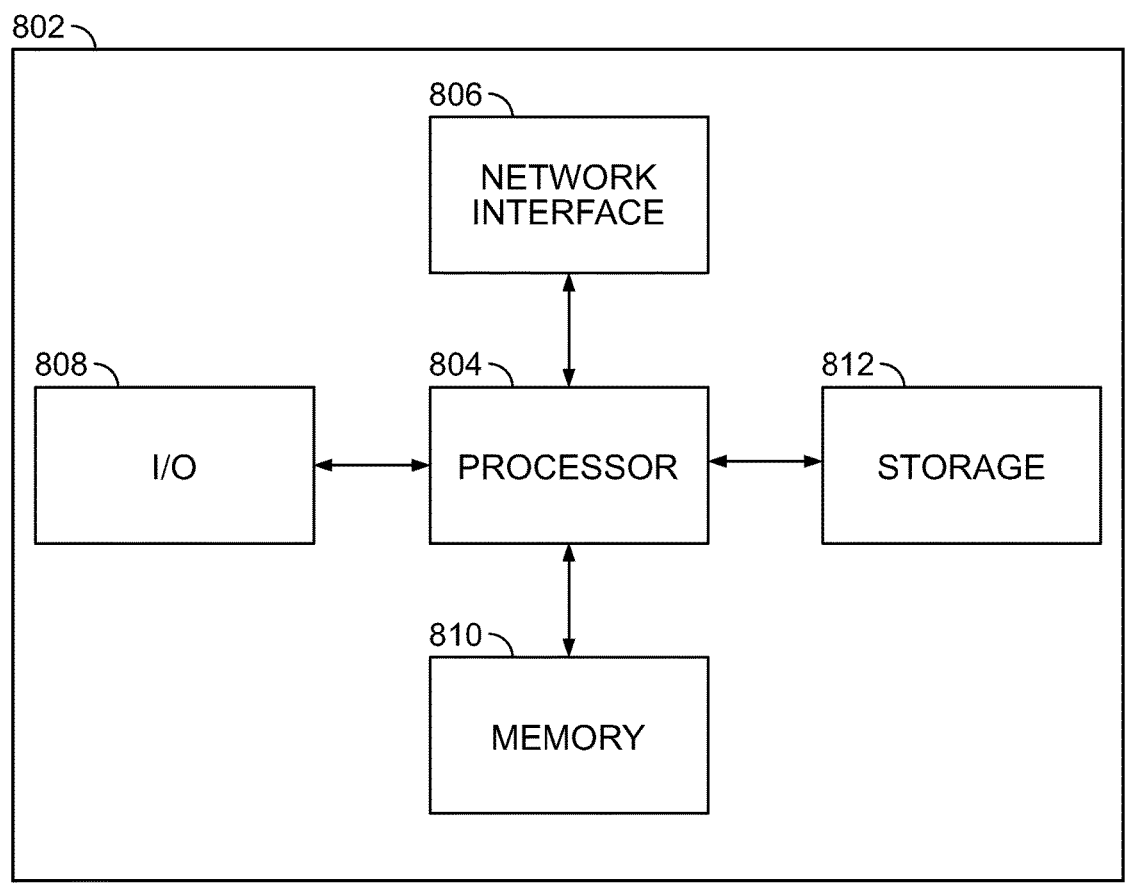
FIG. 8 depicts a high-level block diagram of a computer for implementing components shown in FIGS. 1 and 5 according to one embodiment.

Machine control indicator 104 and other components depicted in FIGS. 1 and 5 can be implemented using a computer. A high-level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.), and loaded into memory 810 when execution of the computer program instructions is desired. Thus, the method steps of FIG. 7 can be defined by the computer program instructions stored in the memory 810 and/or storage 812 and controlled by the processor 804 executing the computer program instructions. For example, the computer program instructions can be implemented as computer executable code programmed by one skilled in the art to perform an algorithm defined by the method steps of FIG. 7. Accordingly, by executing the computer program instructions, the processor 804 executes an algorithm defined by the method steps of FIG. 7. The computer 802 also includes one or more network interfaces 806 for communicating with other devices via a network. The computer 802 also includes input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   receiving initialization sensor values from a seed tender;
   generating an estimated discharge based on the initialization sensor values;
   receiving a weight sensor value from the seed tender after the initialization sensor values;
   generating a threshold value based on the estimated discharge and an additional estimated discharge that is generated based on previous weight sensor values;
   comparing the weight sensor value to the threshold value;
   determining that the weight sensor value is to be transmitted to a seed tender controller in response to the weight sensor value being below the threshold value; and
   determining that the threshold value is to be transmitted to the seed tender controller in response to the weight sensor value being at or above the threshold value,
   wherein the additional estimated discharge approximates weight sensor values changing over time when the seed tender is unloaded in a no wind or low wind environment.

2. The method of claim 1, wherein the initialization sensor values comprise at least ten values, each of the ten values associated with a particular time.

3. The method of claim 1, wherein the initialization sensor values are received after erratic sensor values, the initialization sensor values identified based on changes in value between temporally adjacent initialization sensor values being within a variance threshold.

4. The method of claim 1, wherein the initialization sensor values are received after a period of time after an unload command has been transmitted to the seed tender.

5. An apparatus comprising:
- a load cell; and
- a machine control indicator in communication with the load cell, the machine control indicator performing operations comprising:
  - receiving initialization sensor values from the load cell associated with a seed tender;
  - generating an estimated discharge based on the initialization sensor values;
  - receiving a weight sensor value from the load cell after the initialization sensor values;
  - generating a threshold value based on the estimated discharge;
  - comparing the weight sensor value to a threshold value;
  - generating a weight value based on the comparing; and
  - transmitting a command to the seed tender based on the weight value,
  - wherein the estimated discharge approximates weight sensor values changing over time when the seed tender is unloaded in a no wind or low wind environment.

6. The apparatus of claim 5, wherein the initialization sensor values comprise at least ten values, each of the ten values associated with a particular time.

7. The apparatus of claim 5, wherein the initialization sensor values are received after erratic sensor values, the initialization sensor values identified based on changes in value between temporally adjacent initialization sensor values being within a variance threshold.

8. The apparatus of claim 5, wherein the initialization sensor values are received after a period of time after an unload command has been transmitted to the seed tender.

9. A method for cancelling wind effects on weight sensor values, the method comprising:
- generating an estimated discharge based on initialization sensor values received from a load cell of a seed tender;
- receiving a weight sensor value from the load cell;
- generating a threshold value based on the estimated discharge;
- comparing the weight sensor value to the threshold value, the weight sensor value and the threshold value associated with a same time value;
- generating a new weight sensor value based on the comparing; and
- transmitting the new weight sensor value to a seed tender controller,
- wherein the estimated discharge approximates weight sensor values changing over time when the seed tender is unloaded in a no wind or low wind environment.

10. The method of claim 9, wherein the weight sensor value is received a period of time after an unload command has been transmitted to the seed tender.

11. The method of claim 9, wherein the weight sensor value is received erratic sensor values are no longer received from the load cell.

* * * * *